(12) United States Patent
Kim et al.

(10) Patent No.: US 8,229,522 B2
(45) Date of Patent: Jul. 24, 2012

(54) FOLDER-TYPE PORTABLE COMMUNICATION DEVICE HAVING FLEXIBLE DISPLAY UNIT

(75) Inventors: Yun-Su Kim, Seoul (KR); Jun-Sang Park, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 949 days.

(21) Appl. No.: 11/947,467

(22) Filed: Nov. 29, 2007

(65) Prior Publication Data

US 2008/0167095 A1    Jul. 10, 2008

(30) Foreign Application Priority Data

Jan. 5, 2007    (KR) .................. 10-2007-0001331

(51) Int. Cl.
   *H04M 1/02*    (2006.01)
(52) U.S. Cl. ............... 455/575.3; 361/679.06; 455/566
(58) Field of Classification Search ............ 455/575.3; 361/679.01–679.61
   See application file for complete search history.

(56) References Cited

U.S. PATENT DOCUMENTS

| | | | |
|---|---|---|---|
| 5,530,619 A * | 6/1996 | Koenck et al. ............ | 361/679.3 |
| 6,577,496 B1 | 6/2003 | Gioscia et al. | |
| 7,158,111 B1 | 1/2007 | Jackson et al. | |
| 7,667,962 B2 * | 2/2010 | Mullen ............ | 361/679.56 |
| 2002/0090980 A1 * | 7/2002 | Wilcox et al. ............ | 455/566 |
| 2002/0158967 A1 * | 10/2002 | Janick et al. ............ | 348/87 |
| 2003/0050019 A1 * | 3/2003 | Dowling et al. ............ | 455/90 |
| 2003/0144034 A1 * | 7/2003 | Hack et al. ............ | 455/566 |
| 2004/0052037 A1 * | 3/2004 | Sawyer ............ | 361/681 |
| 2004/0061683 A1 | 4/2004 | Mochizuki | |
| 2004/0092284 A1 * | 5/2004 | Satoh et al. ............ | 455/550.1 |
| 2004/0212956 A1 * | 10/2004 | Kuivas et al. ............ | 361/683 |
| 2005/0174366 A1 * | 8/2005 | Wu et al. ............ | 345/905 |
| 2006/0146488 A1 | 7/2006 | Kimmel | |
| 2007/0211036 A1 * | 9/2007 | Perkins ............ | 345/173 |
| 2008/0151480 A1 * | 6/2008 | Chung et al. ............ | 361/681 |
| 2008/0158795 A1 * | 7/2008 | Aoki et al. ............ | 361/681 |

FOREIGN PATENT DOCUMENTS

| | | |
|---|---|---|
| CN | 1429351 | 7/2003 |
| EP | 0888005 | 12/1998 |
| JP | 09160506 | 6/1997 |
| WO | 2008083361 | 7/2008 |

OTHER PUBLICATIONS

European Search Report dated May 27, 2009.

* cited by examiner

*Primary Examiner* — Kent Chang
*Assistant Examiner* — Kashif Siddiqui
(74) *Attorney, Agent, or Firm* — H.C. Park & Associates, PLC

(57) ABSTRACT

A portable communication device includes a main housing, a folding housing coupled to the main housing by a hinge unit to rotate about a hinge axis, and a flexible display unit that is drawn out from the main housing to open its display screen when the folding housing unfolds.

12 Claims, 8 Drawing Sheets

FOLDER-TYPE PORTABLE COMMUNICATION DEVICE HAVING FLEXIBLE DISPLAY UNIT

CROSS REFERENCE TO RELATED APPLICATION

This application claims priority from and the benefit of Korean Patent Application No. 10-2007-0001331, filed on Jan. 5, 2007, which is hereby incorporated by reference for all purposes as if fully set forth herein.

BACKGROUND OF THE INVENTION

1. Field of the Invention

The present invention generally relates to a portable communication terminal such as a cellular phone, a Personal Communication Service (PCS) terminal, a Personal Digital Assistant (PDA), or a Hand Held Phone (HHP), and in particular, to a folder-type portable communication terminal having a flexible display unit.

2. Discussion of the Background

In terms of portability, portable communication devices have emphasized not only compactness, slimness, excellent gripping properties, and lightness, but also multimedia availability, thus providing a wider variety of functions, e.g., entertainment functions including games or moving picture viewing services.

In particular, future portable communication devices are expected to incorporate greater multi-functionality and multi-purpose utilization including video communication, games, Internet, and camera functions, as well as voice communication functions.

Conventional portable communication devices may be classified according to their appearance in terms of portability and convenience, for example, into bar-type communication devices and folder-type communication devices. The bar-type portable communication device has a single housing shaped like a bar in which data input/output devices and transmission/reception devices are mounted. The folder-type portable communication device has a folder coupled to a single bar-shaped housing by a hinge device in such a manner that the folder can be folded toward and unfolded away from the housing.

For example, in a folder-type portable communication device, a folder may be rotatably coupled to a main body by a hinge unit, keys may be disposed in the main body, and a display unit may be disposed in the folder, which may contribute to miniaturization and portability.

A folder-type portable communication device is disclosed in U.S. Pat. No. 6,865,406, commonly assigned to the assignee of the present application.

However, a display unit that is mounted in a conventional portable communication device may be fixed in a main body housing and various data may be displayed within a fixed area of the display unit, causing visual inconvenience when viewing moving pictures in a Digital Multimedia Broadcasting (DMB) mode, a TV mode, or a Video On Demand (VOD) mode. In other words, due to the small screen displayed in the display unit, users may be inconvenienced when viewing displayed data.

Of course, the foregoing problems may be solved by increasing the size of the portable communication device, mounting a wide display unit, and disposing more keys. However, each of these solutions goes against the miniaturization trend and therefore, may cause inconvenience to users.

SUMMARY OF THE INVENTION

The present invention provides a folder-type portable communication device having a flexible display unit that can be mounted in a small space.

The present invention also provides a folder-type portable communication device that may be capable of providing a wide display screen that is larger than the small main body housing.

The present invention also provides a folder-type portable communication device that may improve a visual interfacing environment in a multimedia environment.

The present invention also provides a folder-type portable communication device that may be more convenient by providing a wide display screen in modes associated with moving picture watching.

Additional features of the present invention will be set forth in the description which follows, and in part will be apparent from the description, or may be learned by practice of the invention.

The present invention discloses a portable communication device including a main housing, a folding housing coupled to the main body housing by a hinge unit to rotate about a hinge axis, and a flexible display unit that is drawn out from the main housing to open its display screen when the folding housing unfolds.

The present invention also discloses a portable communication device including a main housing, a protrusion unit extending along a side end of the main housing, a folding housing coupled to the main housing by a hinge unit to rotate about a hinge axis, and a flexible display unit that is drawn out from the protrusion unit to open its display screen, when the folding housing unfolds.

The present invention also discloses a portable communication device including a main housing including a plurality of first keys that are always exposed, a folding housing coupled to the main housing by a hinge unit to rotate about a hinge axis, and a flexible display unit that is drawn out from the main housing to open its display screen when the folding housing unfolds.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
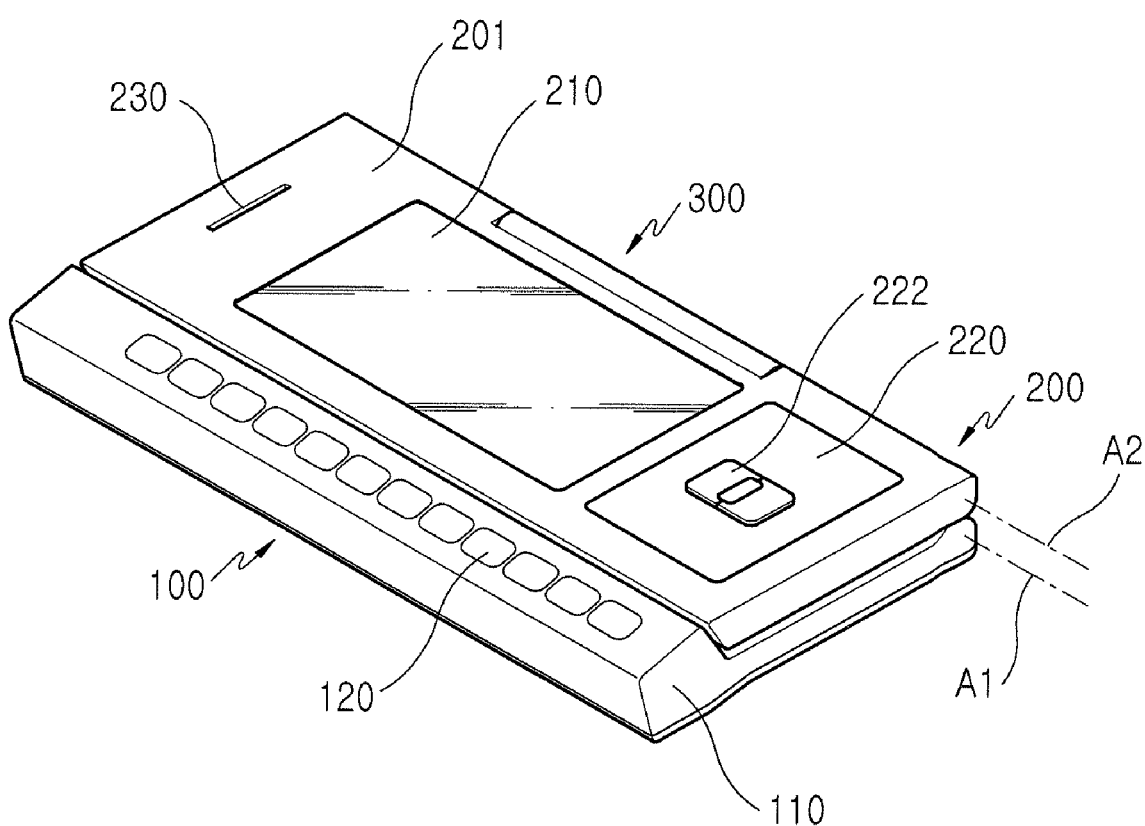
FIG. 1 is a perspective view of a folder-type portable communication device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

As shown in FIG. 1, FIG. 2, FIG. 3, and FIG. 4, a portable communication device according to an exemplary embodiment of the present invention includes a main body housing 100, a folding housing 200 rotatably coupled to the main body housing 100 by a hinge unit 300 to rotate around a first hinge axis A1 and a second hinge axis A2, and a flexible display unit 400 that is drawn out from the main body housing 100 to open its display screen. The longitudinal direction of the main body housing 100 and the longitudinal direction of the folding housing 200 may be parallel to the first hinge axis A1 and the second hinge axis A2. The flexible display unit 400 may be implemented as a flexible Liquid Crystal Display (LCD) device, may be mounted in a rolled-up state, and may be opened by unrolling from the rolled-up state. The hinge unit 300 may be a dual-axis hinge and may provide the first hinge axis A1 and the second hinge axis A2. The first hinge axis A1 and the second hinge axis A2 may be parallel to each other.

The main body housing 100 includes a protrusion unit 110 extending along a side end. The protrusion unit 110 protrudes a predetermined height from the top face of the main body housing 100 in order to accommodate the rolled-up flexible display unit 400. The mounted state of the flexible display unit 400 is shown in FIG. 8.

Figure 8:
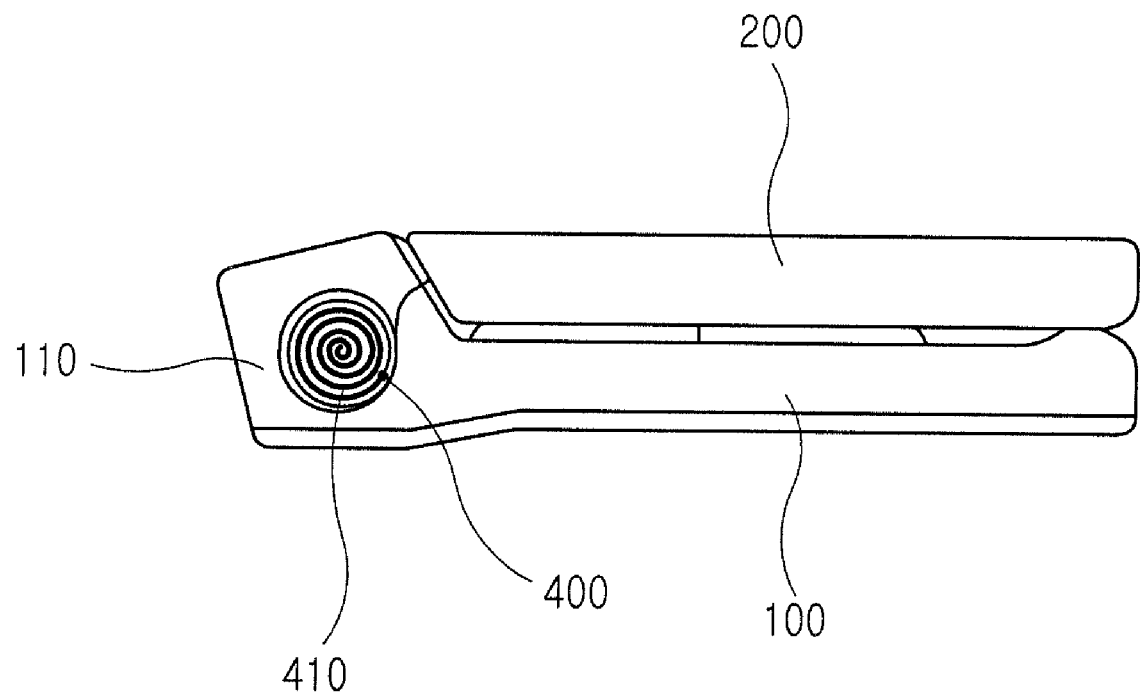
FIG. 8 is a side view of FIG. 1.

As shown in FIG. 8, the flexible display unit 400 may be mounted in the main body housing 100, more specifically, the flexible display unit 400 may be rolled-up in the protrusion unit 110 and may be drawn out from the protrusion unit 110 when the folding housing 200 rotates. An end portion of the flexible display unit 400 may be fixed to the folding housing 200. In other words, the end of the flexible display unit 400 may be fixed to the end portion that moves the most when the folding housing 200 is rotated. When the folding housing 200 is closed, the rolled-up flexible display unit 400 may be automatically rewound into the protrusion unit 110 by a force of an elastic body 410 installed in a rotation axis of the flexible display unit 400.

Figure 4:
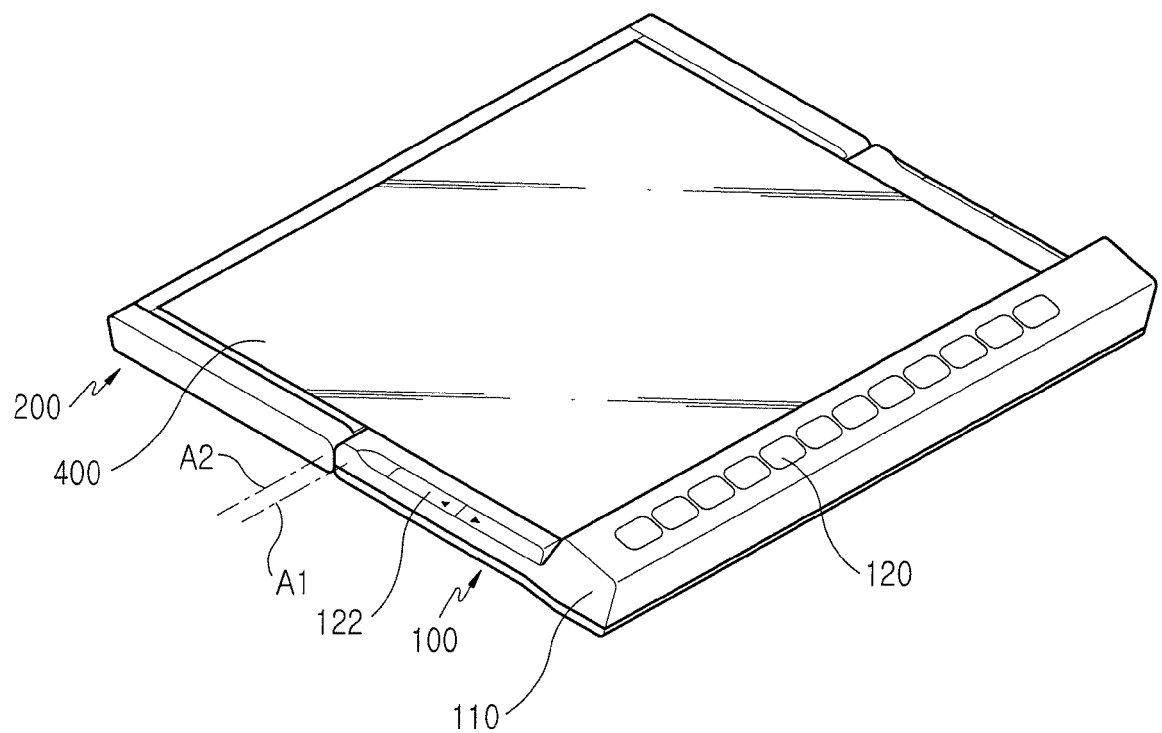
FIG. 4 is a perspective view showing that the flexible display unit is entirely drawn and thus a display region is open.
Figure 5:
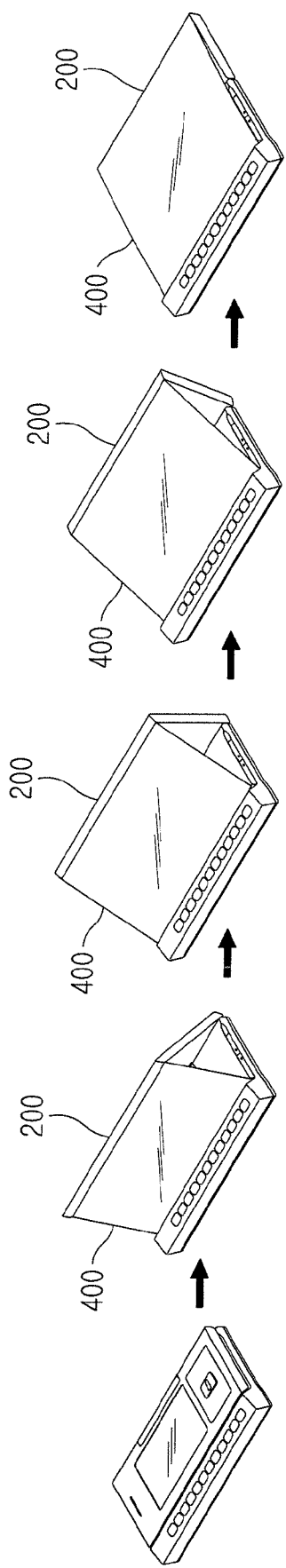
FIG. 5 is a perspective view showing a process of opening a folder-type portable communication device according to an exemplary embodiment of the present invention.

FIG. 5 is a perspective view showing a process of drawing out the flexible display unit 400 according to the opening/closing operations of the folding housing 200. As shown in FIG. 5, the amount by which the flexible display unit 400 is drawn out may be proportional to the amount by which the folding housing 200 is rotated. In other words, the flexible display unit 400 is not drawn out when the folding housing 200 is folded on the main body housing 100, and the flexible display unit 400 is completely drawn out when the folding housing 200 is fully rotated from the main body housing 100. The flexible display unit 400 is completely drawn out in FIG. 4, in which a wide display unit may be provided. As the amount by which the folding housing 200 rotates gradually increases, the amount by which the flexible display unit 400 is drawn out also gradually increases.

As shown in FIG. 1, a plurality of first keys 120 may be arranged on the top face of the protrusion unit 110 in a longitudinal direction. The first keys 120 are always exposed. A fixed display unit 210 and a plurality of second keys 220 that are adjacent to the fixed display unit 210 may be arranged on an external face 201 of the folding housing 200. The second keys 220 may be implemented as touch keys. An optical joystick sensor 222 may be disposed in the second keys 220.

Figure 6:
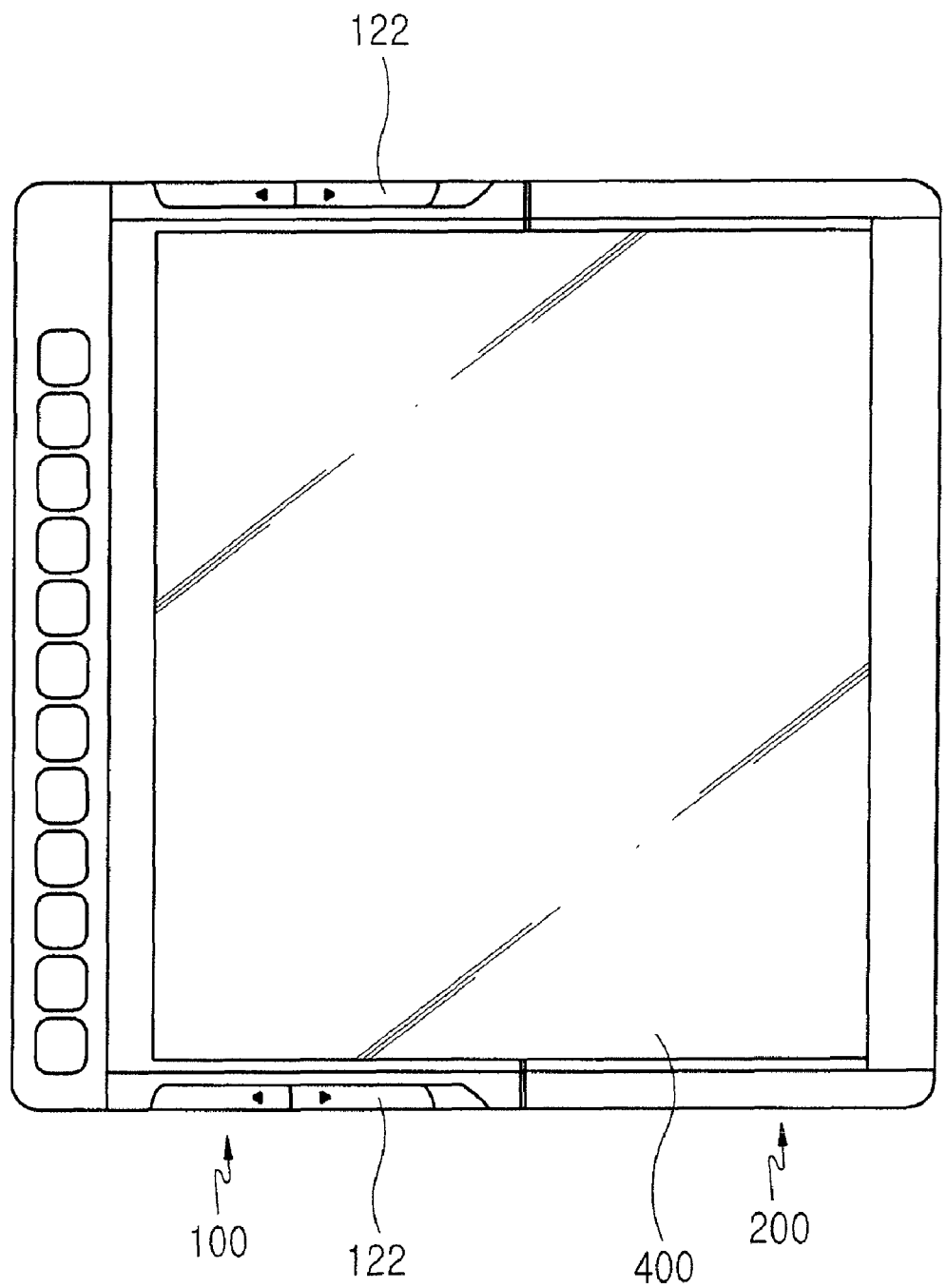
FIG. 6 is a front view of FIG. 4.
Figure 7:
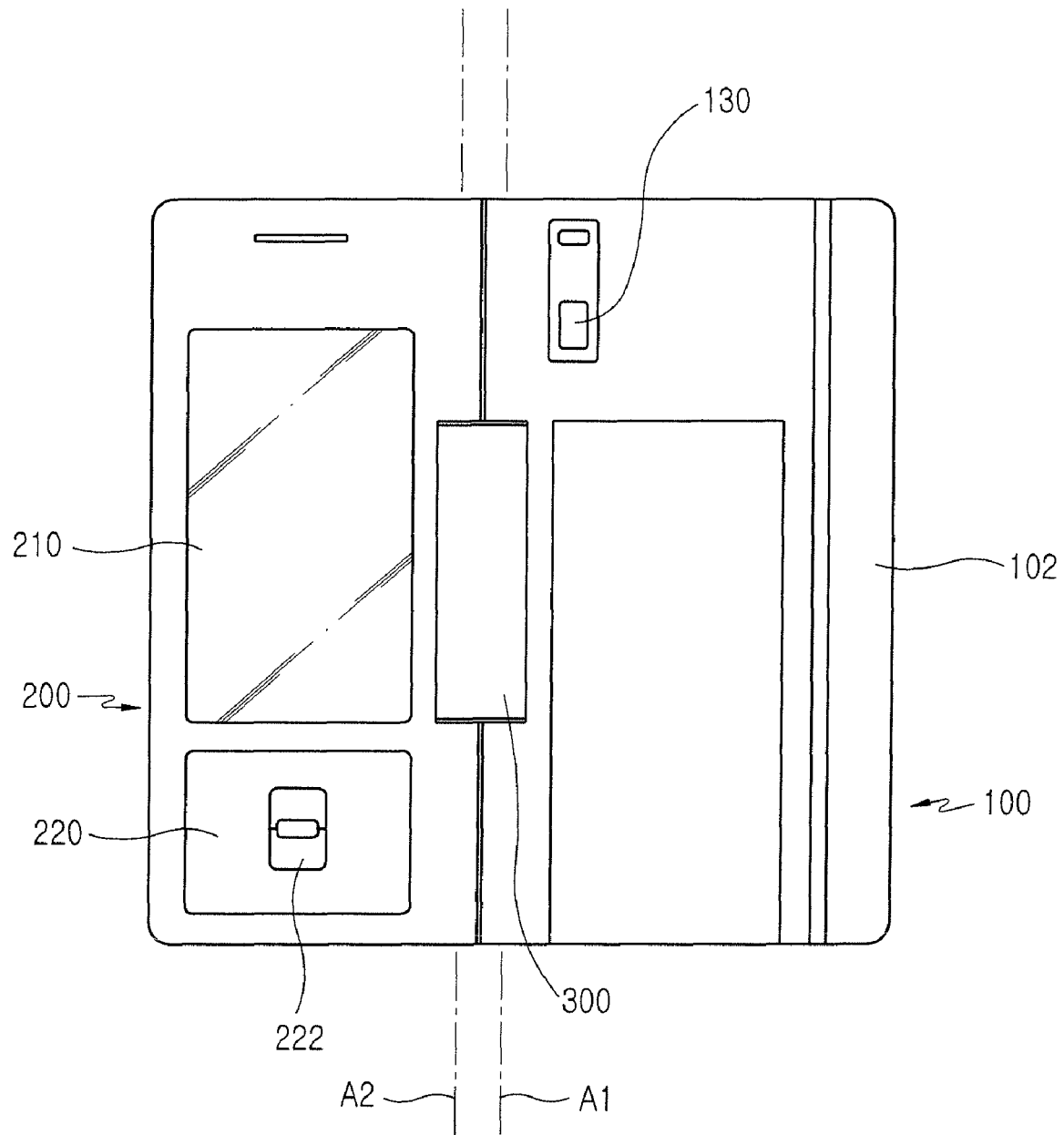
FIG. 7 is a bottom view of FIG. 4.

As shown in FIG. 6, third keys 122 may be disposed in both side ends of the main body housing 100. As shown in FIG. 7, a camera lens 130 may be disposed on the bottom face of the main body housing 100.

Figure 2:
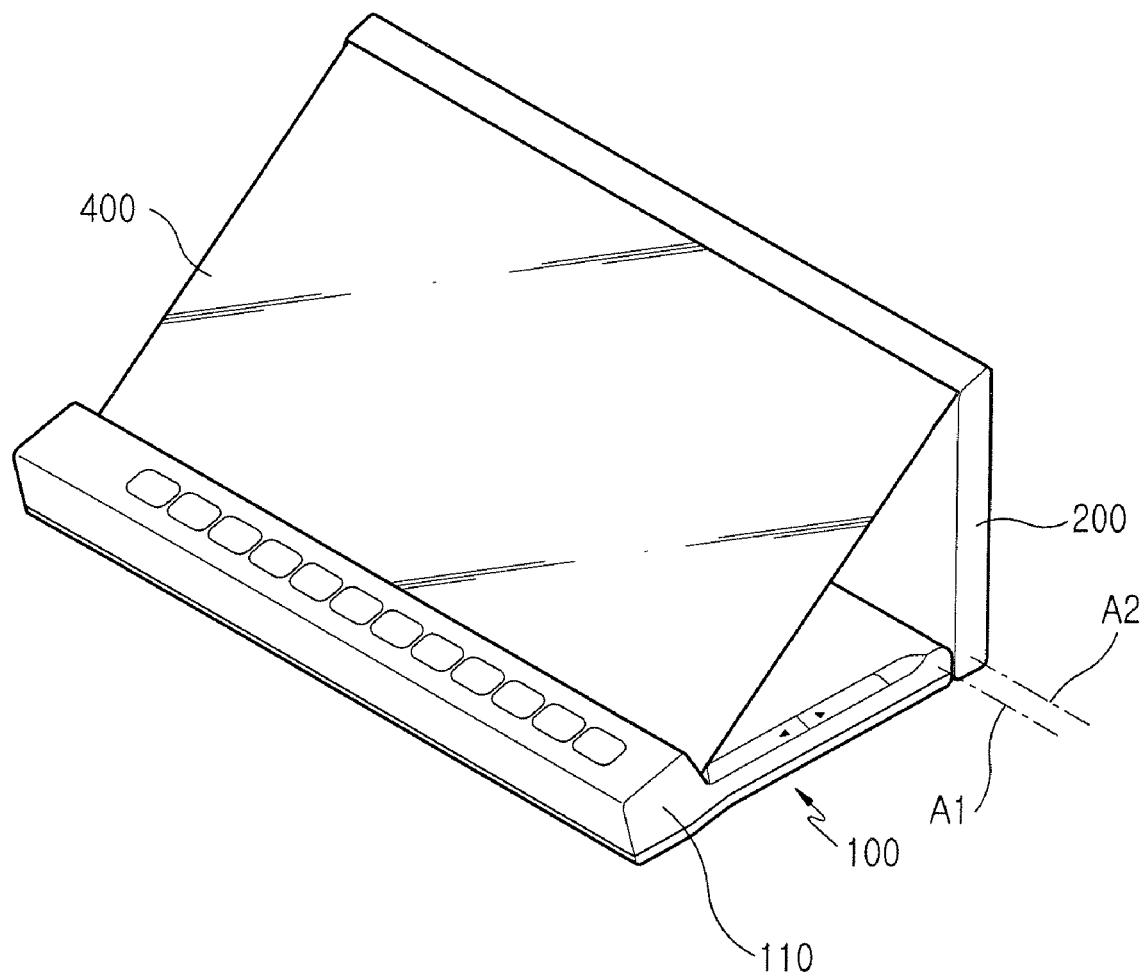
FIG. 2 and FIG. 3 are perspective views showing that a flexible display unit is drawn by rotation of a folding housing of a folder-type portable communication device according to an exemplary embodiment of the present invention.
Figure 3:
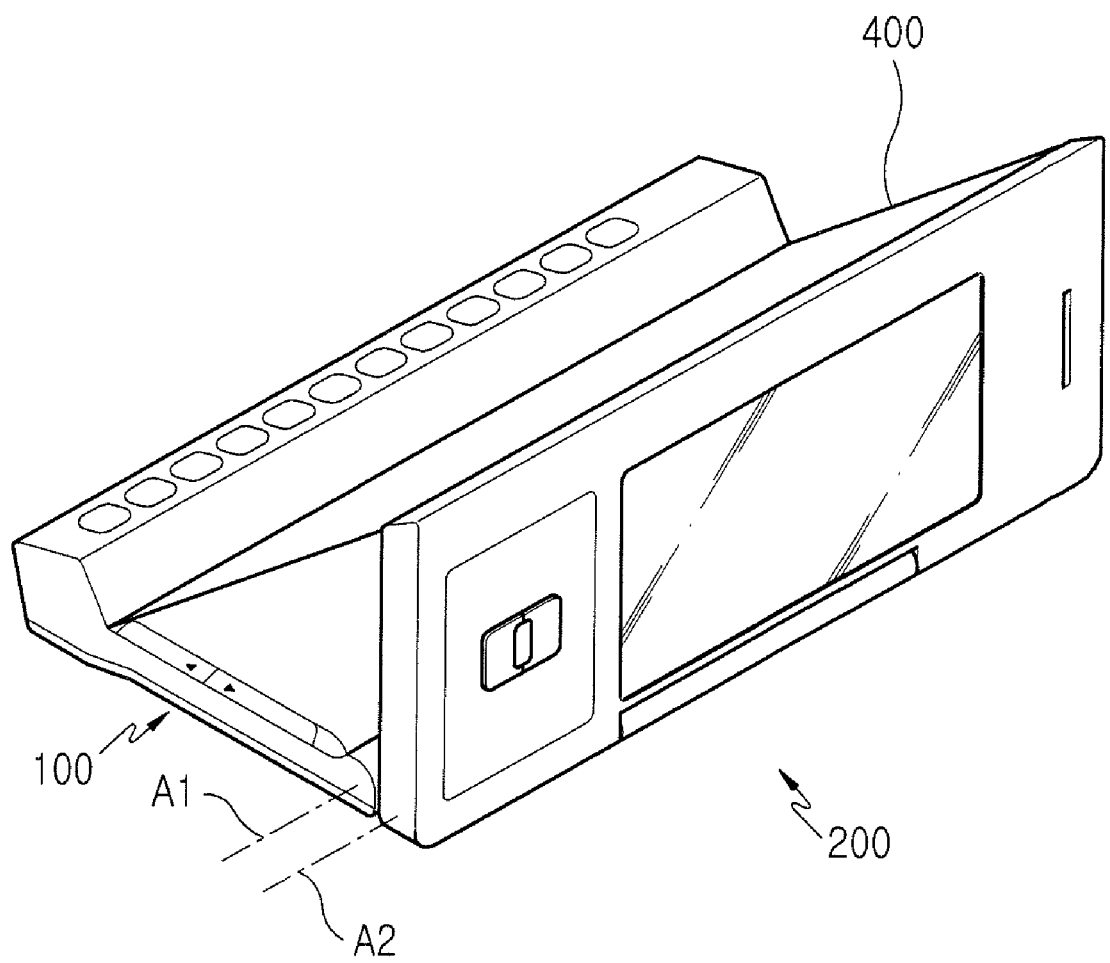

As shown in FIG. 2 and FIG. 3, when the folding housing 200 rotates about 90°, the display screen of the flexible display unit 400 is held in an inclined state. As shown in FIG. 4, when the folding housing 200 rotates about 180°, the display screen of the flexible display unit 400 is opened to the maximum and thus faces the main body housing 100 and the folding housing 200. FIG. 1 shows a state used in a phone mode and FIG. 2, FIG. 3, and FIG. 4 show states that may be convenient for moving picture viewing.

As described above, according to exemplary embodiments of the present invention, a wide display screen may be provided in a small mounting space through a flexible display unit, and a structure in which a main body housing supports the flexible display unit may provide visual stability to users. Therefore, exemplary embodiments of the present invention may improve the visual interfacing environment in the future multimedia age and may provide various applications including e-book or navigation functions.

It will be apparent to those skilled in the art that various modifications and variations can be made in the present invention without departing from the spirit or scope of the invention provided they come within the scope of the appended claims and their equivalents.

What is claimed is:

1. A portable communication device, comprising:
   a main housing;
   a folding housing coupled to the main housing by a hinge unit to rotate about a hinge axis; and
   a flexible display unit that is drawn out from the main housing to open its display screen when the folding housing unfolds,
   wherein the hinge unit is a dual-axis hinge and provides a first hinge axis and a second hinge axis,
   wherein the first hinge axis and the second hinge axis are parallel to each other, and
   wherein the folding housing rotates up to a maximum angle of 180 degrees relative to a top surface of the main housing facing the folding housing.

2. The portable communication device of claim 1, wherein a longitudinal direction of the main housing is parallel to the hinge axis.

3. The portable communication device of claim 1, wherein the flexible display unit is stored in the main housing in a rolled-up state and unrolls when the folding housing unfolds, and an end of the flexible display unit is coupled to the folding housing.

4. A portable communication device, comprising:
   a main housing;
   a protrusion unit extending along a side end of the main housing;

a folding housing coupled to the main housing by a hinge unit to rotate about a hinge axis; and a flexible display unit that is drawn out from the protrusion unit to open its display screen when the folding housing unfolds, wherein the hinge unit is a dual-axis hinge and provides a first hinge axis and a second hinge axis, wherein the first hinge axis and the second hinge axis are parallel to each other, wherein the folding housing rotates up to a maximum angle of 180 degrees relative to a top surface of the main housing facing the folding housing, and wherein the protrusion unit protrudes from the top surface of the main housing by a determined height.

5. The portable communication device of claim 4, wherein the flexile display unit is stored in the protrusion unit in a rolled-up state and is drawn out from the protrusion unit when the folding housing unfolds.

6. The portable communication device of claim 5, wherein the amount by which the flexible display unit is drawn out is proportional to the amount by which the folding housing unfolds.

7. A portable communication device, comprising:
a main housing comprising a plurality of first keys that are always exposed;
a folding housing coupled to the main housing by a hinge unit to rotate about a hinge axis; and
a flexible display unit that is drawn out from the main housing to open its display screen when the folding housing unfolds,
wherein the hinge unit is a dual-axis hinge and provides a first hinge axis and a second hinge axis,
wherein the first hinge axis and the second hinge axis are parallel to each other, and
wherein the folding housing rotates up to a maximum angle of 180 degrees relative to a top surface of the main housing facing the folding housing.

8. The portable communication device of claim 7, wherein a protrusion unit extends along a side end of the main housing and the first keys are arranged on a top face of the protrusion unit, and the protrusion unit protrudes from a top surface of the main housing facing the folding housing by a determined height.

9. The portable communication device of claim 7, wherein the flexible display unit is mounted on an external face of the folding housing and a plurality of second keys is disposed adjacent to the flexible display unit.

10. The portable communication device of claim 8, wherein the flexible display unit is stored in the protrusion unit in a rolled-up state and is drawn out from the protrusion unit when the folding housing unfolds.

11. The portable communication device of claim 7, wherein the amount by which the flexible display unit is drawn out is proportional to the amount by which the folding housing unfolds.

12. The portable communication device of claim 7, wherein the flexible display unit is a flexible liquid crystal display device.

* * * * *